United States Patent [19]

McFarland et al.

[11] Patent Number: 4,566,640

[45] Date of Patent: Jan. 28, 1986

[54] SEPARATING MACHINE HAVING OVERLAPPING SCREW PUMP

[75] Inventors: Archie R. McFarland, Salt Lake City; Bruce L. Preece, Taylor, both of Utah

[73] Assignee: Beehive Machinery, Inc., Sandy, Utah

[21] Appl. No.: 572,155

[22] Filed: Jan. 18, 1984

[51] Int. Cl.$^4$ .................. B02C 19/12; B02C 19/22
[52] U.S. Cl. .................................. 241/74; 241/247; 241/260.1
[58] Field of Search .............. 241/247, 260.1, 74, 241/101 B; 425/204; 366/300, 301; 198/663

[56] References Cited

U.S. PATENT DOCUMENTS

| Re. 31,631 | 7/1984 | McFarland. | |
|---|---|---|---|
| 2,041,619 | 5/1936 | Steele. | |
| 2,581,451 | 1/1952 | Sennet. | |
| 2,661,040 | 12/1953 | Güldenring. | |
| 3,215,355 | 11/1965 | Shouvlin et al. | 241/247 |
| 3,458,321 | 7/1969 | Reinhart et al. | 366/300 X |
| 3,739,994 | 6/1973 | McFarland. | |
| 3,813,082 | 5/1974 | Manser. | |
| 4,025,001 | 5/1977 | Yarem et al. | |
| 4,025,058 | 5/1977 | Mizuguchi. | |
| 4,042,176 | 8/1977 | Beck et al. | |
| 4,069,980 | 1/1978 | Yarem et al. | |

OTHER PUBLICATIONS

International Application WO82/04449, Dec. 1982.
Russian article, Meat Industry USSR 1961, No. 2, pp. 8-9, by A. Skrypnik, Leningrad Meat Industry, including an English translation.

Primary Examiner—Mark Rosenbaum
Attorney, Agent, or Firm—Burmeister, York, Palmatier, Hamby & Jones

[57] ABSTRACT

The disclosed machine is adapted to separate meat and other soft components from bone and other relatively hard components of meat, fish and other food materials, pieces of which are dumped into a hopper containing a pair of overlapping, oppositely rotating left and right hand feed screws for feeding the pieces into overlapping pump bores in a pump casing. The pump bores are provided with oppositely rotating left and right hand pump screws for pumping the pieces along the bores to develop pumping pressure, whereby the pieces are forced into a hollow separator casing having a tubular tapering separator screen with a multiplicity of perforations therein. A tapered pressure auger is rotatable in the screen for pressing meat and other soft components through the perforations while transporting bone and other hard components past the screen to a discharge device for discharging the hard components while maintaining pressure in the separator casing. The discharge device may grind up the hard components and discharge through a restricted annular orifice. The machine may include a pair of oppositely rotating, closely spaced disjointer screws of the same hand, disposed ahead of the feed screws, for disjointing neck bones and the like, while supplying the disjointed bones to the feed screws. The pump screws may have tapered exit ends affording increased clearance to reduce the buildup of pump pressure.

22 Claims, 21 Drawing Figures

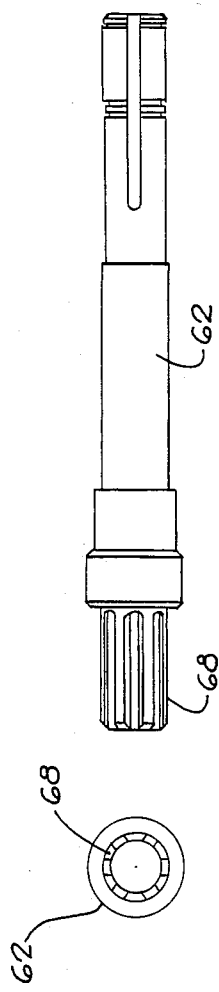
FIG. 6
FIG. 7
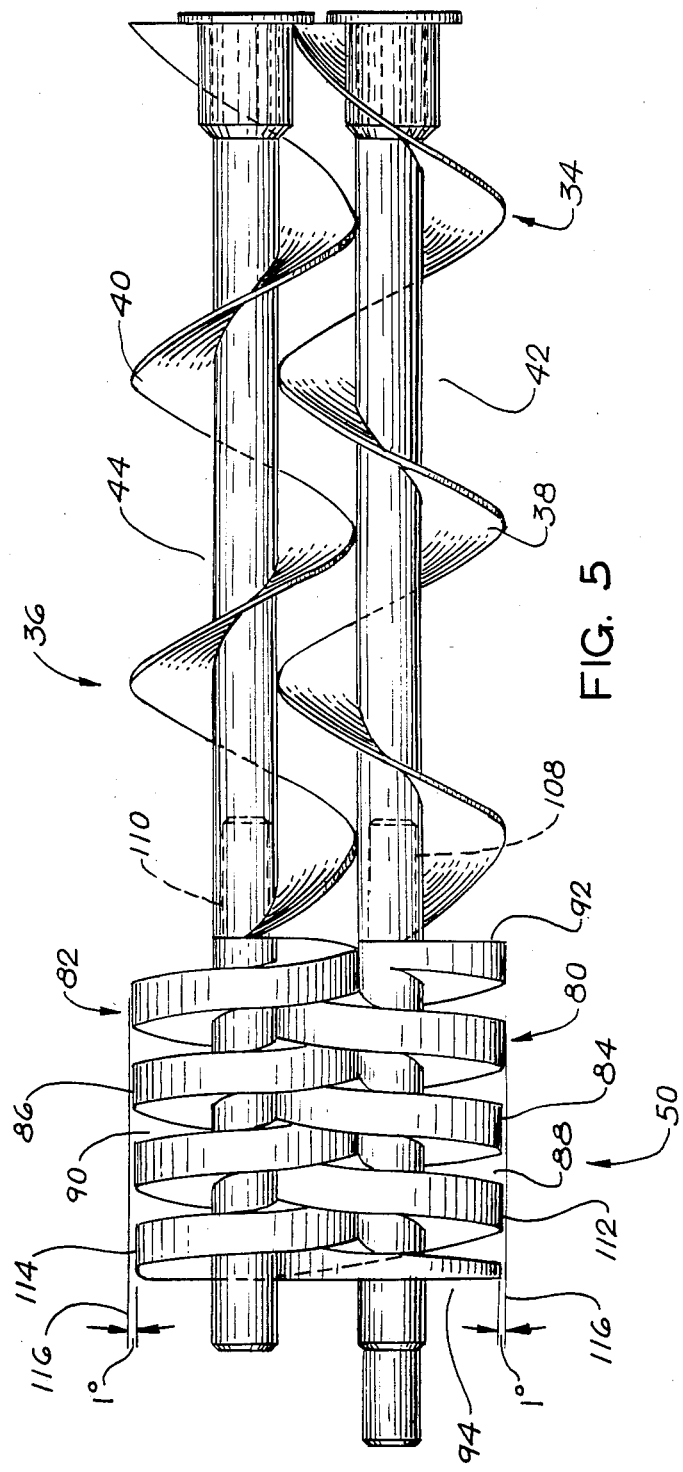
FIG. 5

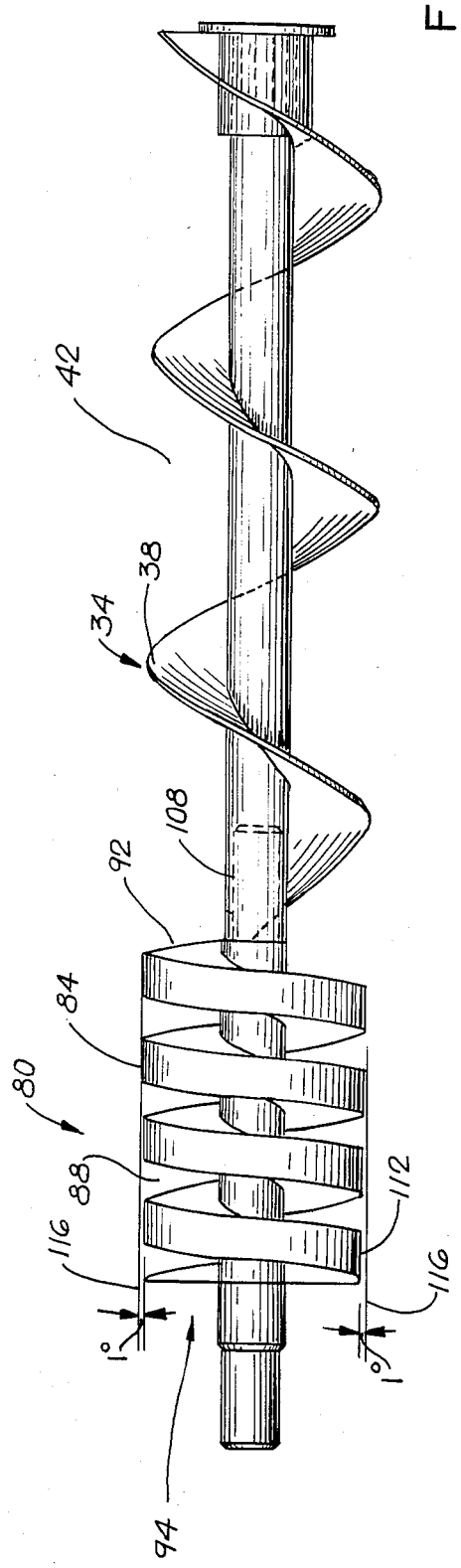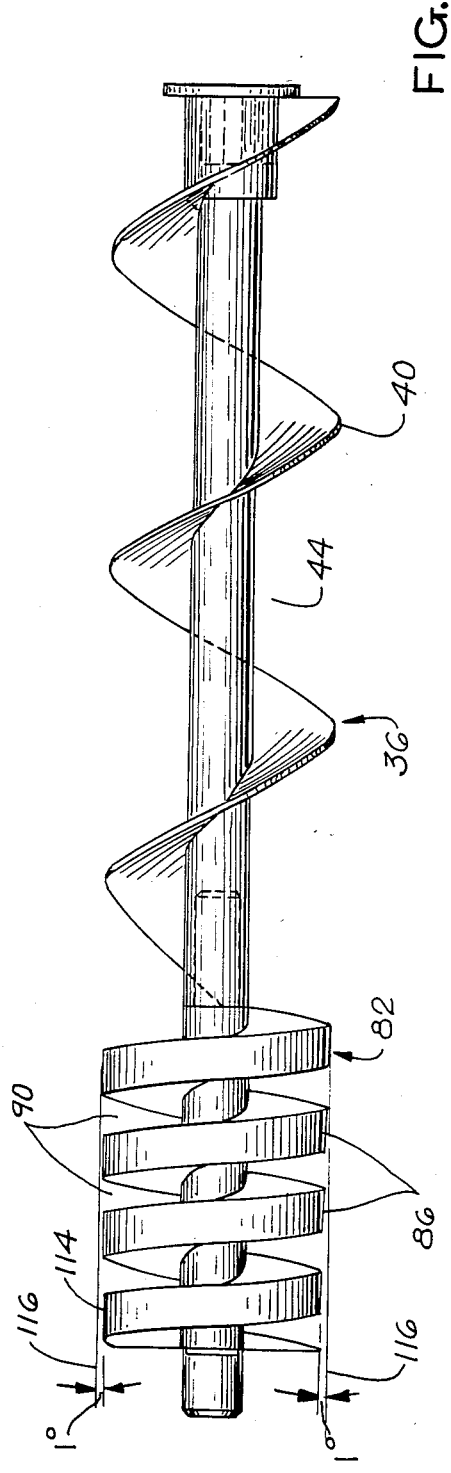

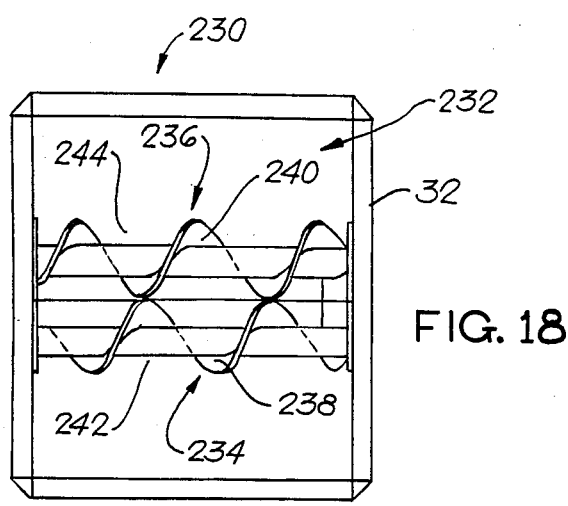
FIG. 18
FIG. 17
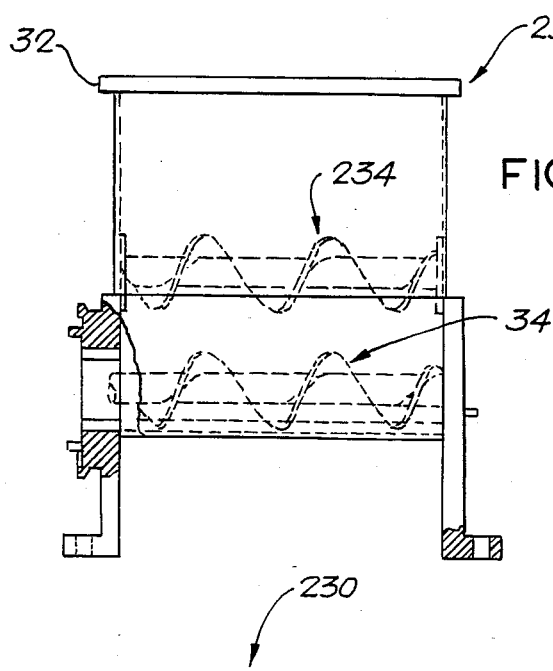
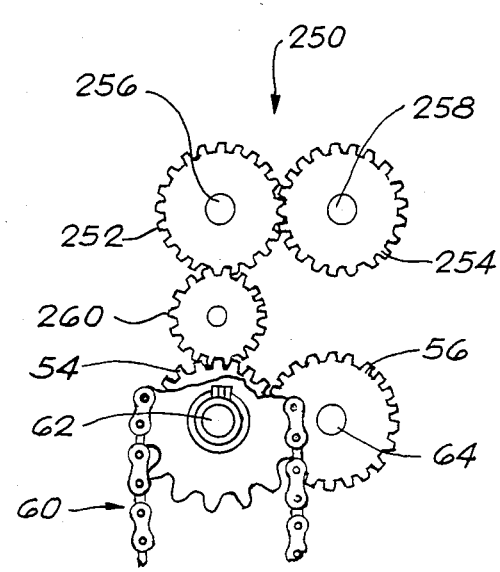
FIG. 20
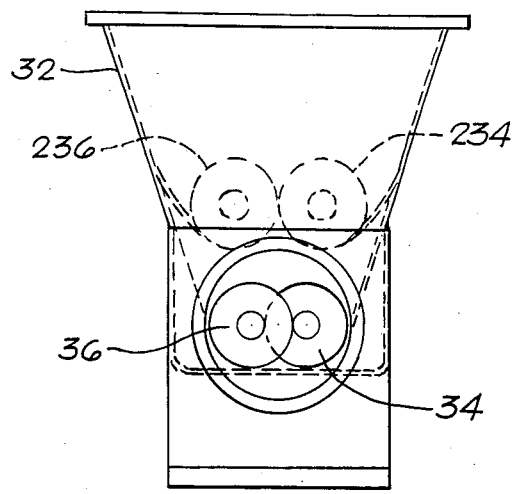
FIG. 16
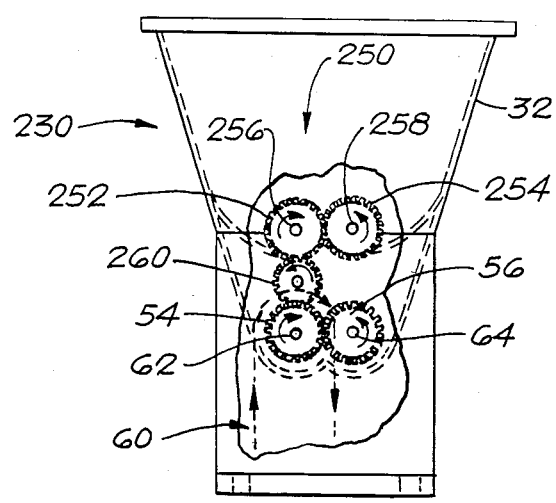
FIG. 19

SEPARATING MACHINE HAVING OVERLAPPING SCREW PUMP

FIELD OF THE INVENTION

This invention relates to separating machines for receiving pieces of bony meat or fish, or other food materials containing relatively soft and relatively hard components, and for separating the meat and other soft components from the bone and other hard components. As applied to bony meat or fish, such machines are often referred to as deboning machines.

BACKGROUND OF THE INVENTION

The McFarland U.S. Pat. No. 3,739,994, issued June 19, 1973, discloses a known deboning machine, in which bony pieces of meat or fish are first ground or chopped in a meat grinder utilizing a screw which presses the pieces against a perforated plate. The pieces are then ground or chopped by rotary blades adjacent the plate. The ground material passes through the perforations in the plate into a separator housing having a generally cylindrical screen with a multitude of small perforations therein. A pressure auger is rotatable within the screen, with close clearance therebetween. The pressure auger develops pressure which presses the meat and other soft materials through the perforations of the screen, while the particles of bone and other hard materials are propelled by the auger to the discharge end of the separator housing from which the hard particles are discharged through restricted orifice formed by an annular valve which maintains pressure in the separator housing.

In another embodiment of the deboning machine, as disclosed in such McFarland patent, the bony meat or fish material is ground separately and is introduced into the separator housing by a food pump, which may be of the rotary vane type.

In the McFarland deboning machine, a filter mat of bone and fibrous particles is formed on the screen, in the clearance space between the screen and the pressure auger, and is effective to filter out small particles of bone and other hard materials. However, due to the initial grinding or chopping of the bony meat or fish material, the ground material contains a fair percentage of small particles of bone and other hard materials. An appreciable percentage of such small particles of bone and other hard materials manages to pass through the filter mat and the perforations with the meat and other soft materials. The presence of the small hard particles in the meat is undesirable.

Thus, the deboning or separating machines of the prior art present the problem of reducing, as much as possible, the percentage of small particles of bone and other hard materials which come out of the machine, mixed with the meat and other soft materials.

SUMMARY OF THE INVENTION

Thus, one object of the present invention is to provide a new and improved separating machine which significantly reduces the percentage of small particles of bone and other hard materials which are mixed with the meat and other soft components, as discharged from the machine.

A further object is to provide a new and improved separating machine which receives relatively large pieces of bony meat or fish, which have not been previously ground, the machine being constructed and arranged so as to avoid or minimize grinding or crushing of the bone, so that the production of small bony particles is minimized. By minimizing the production of bony particles, the discharge of small bony particles with the meat is minimized.

To accomplish these objects, the present invention may provide a separating machine for receiving pieces of bony meat or fish, or other food materials, and for separating meat and other soft components from bone and other relatively hard components of such pieces, such machine preferably comprising a hopper or other entrance member for receiving such pieces of meat or fish or other food materials, feed means, preferably a pair of overlapping oppositely rotating feed screws for feeding such pieces out of the hopper and into the exit opening leading from the hopper, a pump casing connected to the hopper and having overlapping pump bores with entrance ends connecting with such exit opening, the pump bores also having exit ends, a pair of overlapping oppositely rotating pump screws rotatably received in the pump bores for pumping the pieces along the bores between the entrance and exit ends thereof to develop pumping pressure, drive means for driving the feed screws in opposite directions of rotation while also driving the pump screws in opposite directions of rotation, the pump screws having close clearances with the pump bores and with each other for developing pumping pressure at the exit ends of the pump bores, a hollow separator casing having an entrance end connecting with the exit ends of the pump bores for receiving the pieces therefrom, the separator casing also having an exit end, the separator casing having a generally tubular separator screen disposed between the entrance and exit ends of the separator casing, such screen having a multiplicity of perforations therein through which meat and other soft components are pressed while the screen retains bone and other hard components, a pressure auger rotatable in the separator casing and having close clearance with such separator screen for pressing meat and other soft components through such perforations while transporting bone and other hard components past such separator screen to the exit end of the separator casing, additional driving means for rotating the pressure auger, and discharge means at the exit end of the separator casing for discharging the bone and other hard components therefrom while maintaining pressure in the separator casing. The discharge means may include means for grinding the bone into particles which are small enough to pass through a restricted annular valve orifice. In this way, the bone is ground after it passes the separator screen so that the bone particles cannot pass through the screen.

The overlapping pump screws are effective to pump the bony pieces while avoiding or minimizing the grinding or crushing of the bony components.

The pump bores and the pump screws may have clearances therebetween which are greater toward the exit ends of the pump bores than at the entrance ends thereof to reduce the buildup of pressure by the pump screws toward the exit ends of the pump bores. Excess pressure may tend to cause grinding or crushing of the bony components.

The pump screws may have diameters which are tapered toward the exit ends of the pump bores, such tapered diameters being effective to produce such greater clearances which reduce the buildup of pressure. The buildup of pressure is reduced by the flow of soft materials through the greater clearances. The taper may be small, such as only 1°, for example.

The pump screws may have screw flights with grooves therebetween, such pump screws being generally parallel and having the screw flights of each pump screw meshing with the grooves of the other pump screw.

The pump screws may have respective left and right hand screw flights, whereby the oppositely rotating pump screws having a pumping action in the same direction along the longitudinal axes of the pump screws.

The oppositely rotating overlapping feed screws may have left and right hand screw flights with grooves therebetween, the screw flights of each feed screw meshing with the grooves of the other feed screw. The feed screws are rotated in opposite directions such that the overlapping portions of the screws are moving away from the hopper or other entrance member so as to draw the pieces of the incoming material from the hopper and into the feed screws.

The pump screws may be connected coaxially with the feed screws. The drive means may rotate both the feed screws and the pump screws. The pressure auger may have a coaxial driving connection with one of the pump screws.

In some cases, the separating machine may also include a pair of generally parallel closely spaced oppositely rotating disjointer screws in the hopper or other entrance member for feeding the pieces of food material from the hopper to the feed screws while tending to disjoint such pieces. Disjointer screw drive means may be provided for rotating the disjointer screws in opposite directions of rotation such that the closely adjacent portions of the disjointer screws are moving away from the hopper and toward the feed screws to propel the pieces from the hopper and between the disjointer screws toward the feed screws.

The oppositely rotating disjointer screws may have screw flights of the same hand, whereby the disjointer screws tend to propel the pieces in opposite directions relative to the longitudinal axes of the disjointer screws, thus tending to tear and disjoint such pieces.

The disjointer screws may have relatively narrow screw flights with relatively wide grooves therebetween so that the pieces of material pass between the disjointer screws without being crushed or ground to any appreciable extent.

The feed screws may have relatively narrow screw flights with relatively wide grooves therebetween, so that the pieces of material are propelled by the feed screws without being crushed to any substantial extent.

The pump screws are preferably made with large enough grooves to avoid any substantial crushing or grinding of the bony or other hard components of the material being pumped.

BRIEF DESCRIPTION OF THE DRAWINGS

Further objects, advantages and features of the present invention will appear from the following description, taken with the accompanying drawings, in which:

FIG. 5 is a plan view showing the overlapping feed screws and pump screws for the machine of FIG. 1.

FIG. 6 is a plan view of one of the extension drive shafts for the screws of FIG. 5.

FIG. 7 is an end view of the shaft of FIG. 6.

FIGS. 8 and 9 are plan views of the pump screws of FIG. 5, shown individually.

FIG. 16 is an end view of a modified embodiment, utilizing a pair of disjointer screws in the entrance hopper, above the feed screws.

FIG. 17 is a fragmentary side view showing the modified embodiment of FIG. 16, with the disjointer screws shown above the feed screws.

FIG. 18 is a fragmentary plan view of a modified embodiment of FIG. 16, showing the disjointer screws.

FIG. 19 is an opposite end view of the modified embodiment, with a portion of the housing broken away to show internal details, including the gears for driving the feed screws and the disjointer screws.

FIG. 20 is an enlarged fragmentary elevation, similar to a portion of FIG. 19, showing the drive means for the feed screws and the disjointer screws.

DETAILED DESCRIPTION OF ILLUSTRATIVE EMBODIMENTS

As just indicated, FIGS. 1–15 illustrative a separating machine 30 for separating soft components from relatively hard components of a food material. The separating machine 30 is intended primarily as a deboning machine, for receiving pieces of bony meat or fish, and for separating meat and other soft components from bone and other hard components. The machine 30 is suitable for deboning a wide variety of bony meat pieces, as, for example, neck bones or spinal bones with small amounts of meat adhering thereto.

Figure 1:
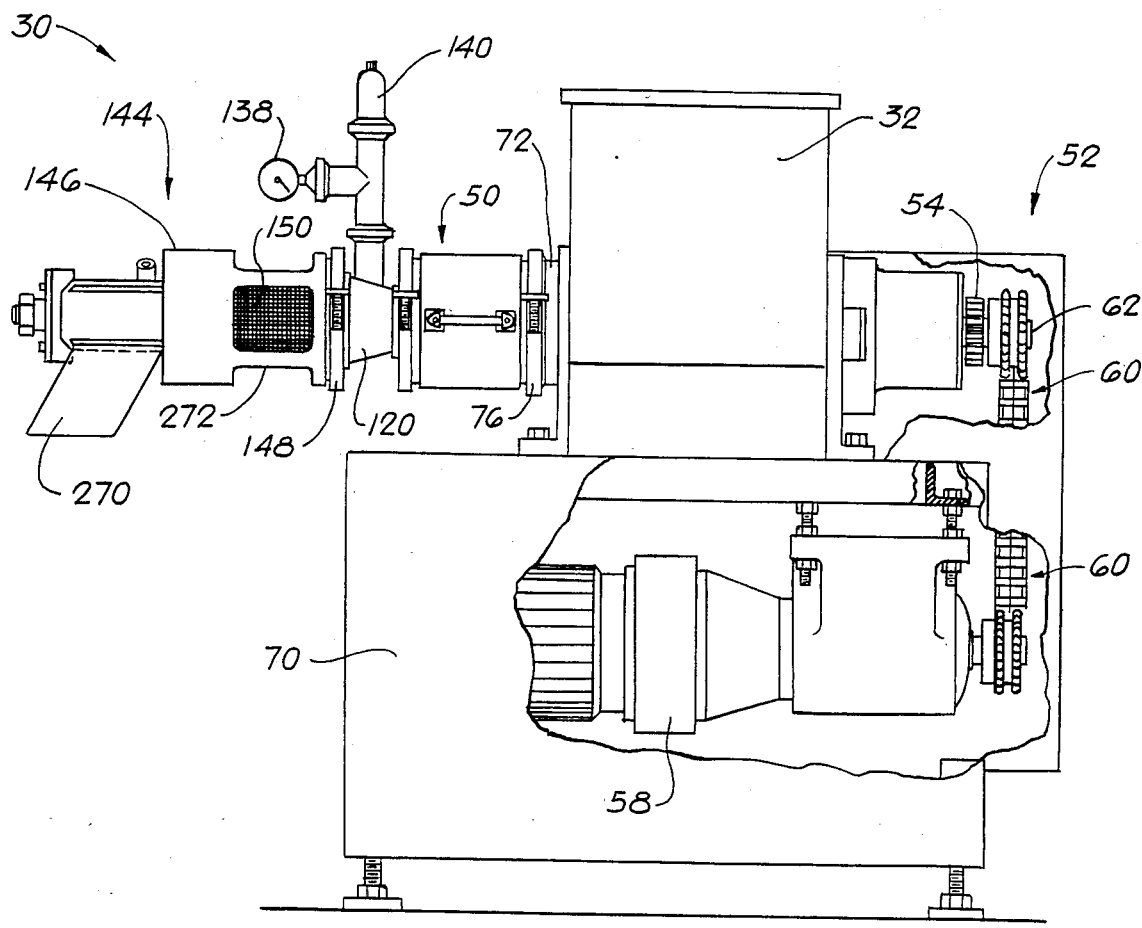
FIG. 1 is a side elevation of a separating or deboning machine to be described as an illustrative embodiment of the present invention, certain portions of the machine being broken away to reveal internal details.
Figure 2:
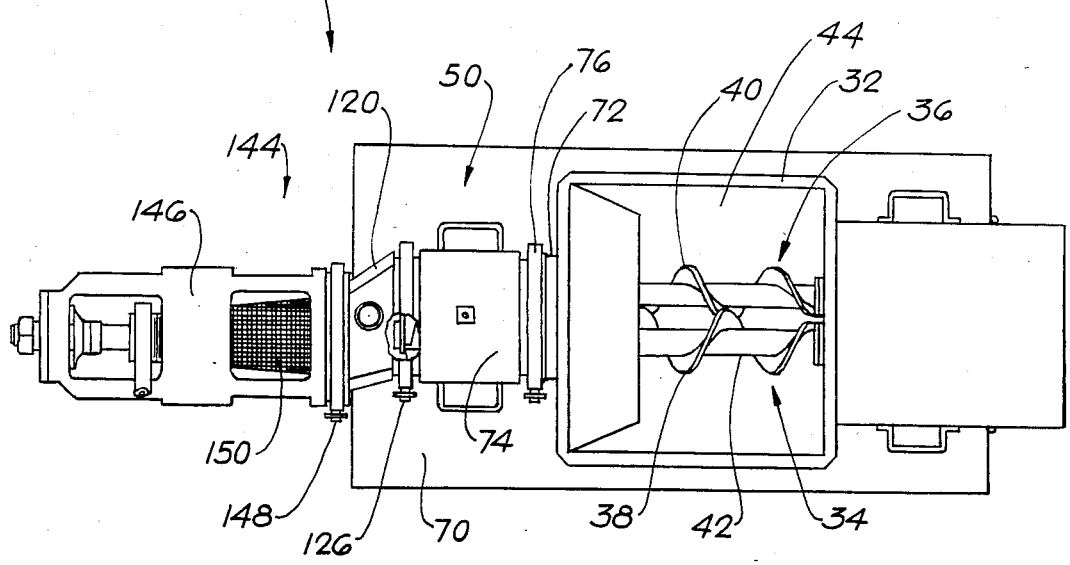
FIG. 2 is a plan view of the machine of FIG. 1.
Figure 4:
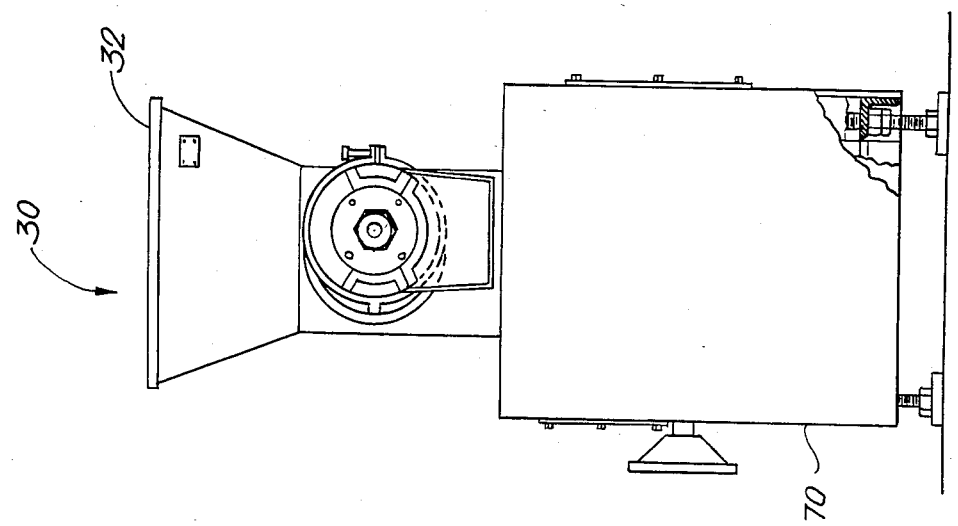
FIGS. 3 and 4 are right and left hand end views of the machine of FIG. 1, with certain portions broken away to reveal internal details.
Figure 3:
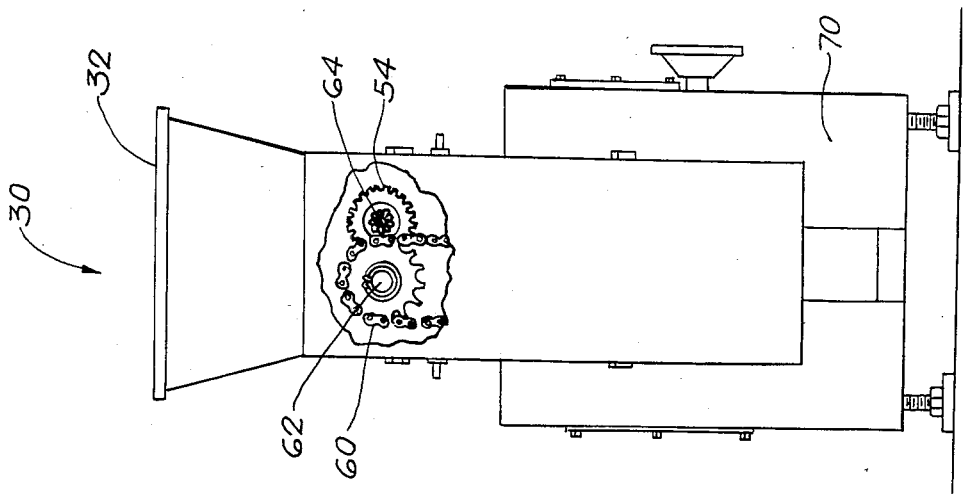

As shown in FIGS. 1–4, the pieces of bony meat or other food materials are supplied to an entrance member in the form of a hopper 32. The pieces are transported from the hopper 32 by a pair of oppositely rotating overlapping feed screws 34 and 36 having respective left and right hand screw flights 38 and 40 with grooves 42 and 44 therebetween. The screw flights 38 and 40 mesh with the grooves 44 and 42 of the opposite screws. Because of the left and right hand screw flights 38 and 40, the oppositely rotating screws 34 and 36 transport the incoming pieces in the same direction, to the left, as shown in FIG. 2, along the longitudinal axes of the screws 34 and 36. In this way, the screws 34 and 36 transport the pieces into the entrance end of an overlapping screw pump 50, to be described in detail presently.

It will be seen from FIG. 2 that the flights 38 and 40 of the feed screws 34 and 36 are much narrower than the grooves 42 and 44 of the screws. Moreover, the grooves 42 and 44 are larger in width than the size of at least most of the incoming pieces, so that the screws 34 and 36 are able to transport the pieces without substantially crushing or grinding the bony components.

The oppositely rotating feed screws 34 and 36 are rotating in such directions that the overlapping screw flights 38, 40 are moving downwardly, away from the entrance of the hopper 32, so that the pieces of food material are drawn away from the hopper and between the feed screws 34 and 36.

The feed screws 34 and 36 are rotated in opposite directions by drive means 52, illustrated as comprising meshing gears 54 and 56 connected to the screws 34 and 36. A motor 58 provides the motive power to drive the screws 34 and 36. The motor 58 may be of the variable speed gear reduction type. A suitable drive, such as a chain drive 60, is connected between the motor 58 and the shaft 62 which carries the gear 54 and is connected to one of the feed screws, such as the screw 34. A similar extension shaft 64 carries the gear 56 and is connected to the other screw 36. The extension shafts 62 and 64 are shown in FIGS. 5-7 in greater detail. The shafts 62 and 64 have spline couplings 68 to the screws 34 and 36. The motor 58 is mounted within a housing 70 which serves as the base for the machine 30.

The hopper 32 has an exit 72 connecting with the overlapping screw pump 50, which has a pump casing 74. A quick disconnect ring clamp 76 may be employed between the exit 72 and the pump casing or housing 74.

FIGS. 5-15 show details of the overlapping screw pump 50, which employs overlapping pump screws 80 and 82, as shown in FIGS. 5, 8 and 9, with respective left and right hand screw flights 84 and 86 thereon, having grooves 88 and 90 therebetween. The screw flights 84 and 86 mesh with the grooves 90 and 88 on the opposite screws. The overlapping pump screws 80 and 82 have entrance and exit ends 92 and 94 and are adapted to transport the bony pieces while producing pump pressure.

Figure 15:
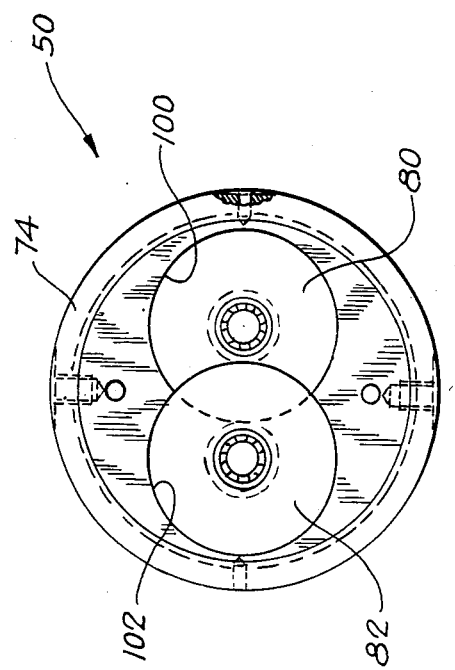
FIG. 15 is an end view of the pump casing, showing the overlapping pump screws.
Figure 14:
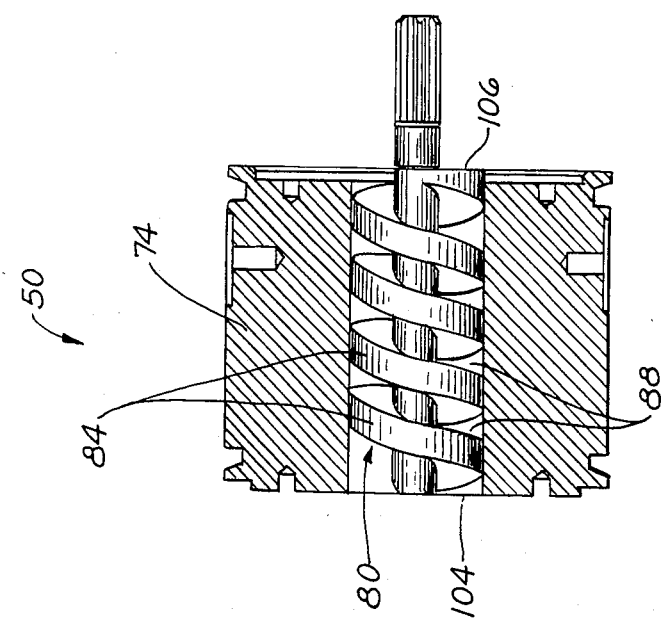
FIG. 14 is a longitudinal section taken through the pump casing and showing one of the pump screws.

As shown in FIGS. 14 and 15, the pump casing 74 is provided with overlapping pump bores 100 and 102, in which the overlapping pump screws 80 and 82 are rotatably received, with close clearances therebetween, to enable the screws 80 and 82 to develop pumping pressure. The overlapping bores 100 and 102 have entrance and exit ends 104 and 106.

As previously indicated, the overlapping pump screws 80 and 82 are rotatably driven in opposite directions of rotation. In this case, as shown in FIG. 5, the pump screws 80 and 82 have coaxial driving connections 108 and 110 to the feed screws 34 and 36. However, any other suitable driving means could be provided to drive the pump screws 80 and 82.

Close clearances are provided between the overlapping pump screws 80 and 82, and also between the screws and the pump bores 100 and 102, to enable the pump screws to build up pumping pressure at the exit ends 106 of the pump bores. As the pressure builds up, the pressure forces some of the meat fibers and other soft components into the clearances to act as seals to maintain the pressure.

However, it is desirable to avoid the buildup of excessive pressure at the exit ends 106 of the pump bores 100 and 102. To control and reduce the buildup of pressure, the clearances between the screws 80 and 82 and the pump bores 100 and 102 may be made progressively greater, toward the exit ends 106 of the pump bores. This increase or flaring of the clearances may advantageously be achieved by providing tapered exit end portions 112 on the pump screws 80 and 82, as illustrated in FIG. 5. The taper angle 116 may be varied, but typically is quite small, such as 1°, for example. The tapering of the pump screws 80 and 82 reduces the pressure buildup by increasing the flow of soft components through the increased clearances provided by the tapered end portions 112 and 114. For any particular application, the pressure buildup can be controlled by providing the pump screws 80 and 82 with an appropriate taper, which may be varied for different models of the separating machine. The taper is a parameter which is easy to vary in the manufacture of the machine.

The flights 84 and 86 of the pump screws 80 and 82 are only slightly narrower than the grooves 88 and 90 therebetween to provide close clearances between the meshing flights and grooves. The size of the grooves 88 and 90 is preferably comparable to the size of the bony components of the pieces of bony meat to be transported, so that the pump screws 80 and 82 are able to transport such pieces without substantially crushing or grinding the bony components. In this way, the production of fine bone particles is minimized.

The pressurized pieces of bony meat or fish or other food material are discharged from the screw pump 50 into a hollow transitional housing 120 having entrance and exit ends 122 and 124, as shown in FIGS. 1 and 2 and 11-13. A quick disconnect ring clamp 126 may be provided between the pump casing 24 and the transitional housing 120.

The transitional housing 120 may have a wall 128 having varying openings 130 and 132 for the ends of the pump screws 80 and 82. The wall 128 is formed with large apertures 134 and 136 through which the pieces discharged by the screw pump 50 pass into the transitional housing 120. The wall 128 is preferably shaped to minimize grinding of the bony components of the pieces.

As shown in FIG. 1, a pressure gauge 138 may be connected to the transitional housing 120 to measure the pressure therein. A pressure relief or safety valve 140 may also be connected to the transitional housing 120.

The transitional housing 120 conveys the pieces of food material to a separator unit 144 having a hollow generally cylindrical separator casing 146. A quick disconnect ring clamp 148 may be provided between the transitional housing 120 and the separator casing 146. The separator unit 144 separates the soft components from the hard components of the pieces of food material, such as bony pieces of meat or fish.

Figure 10:
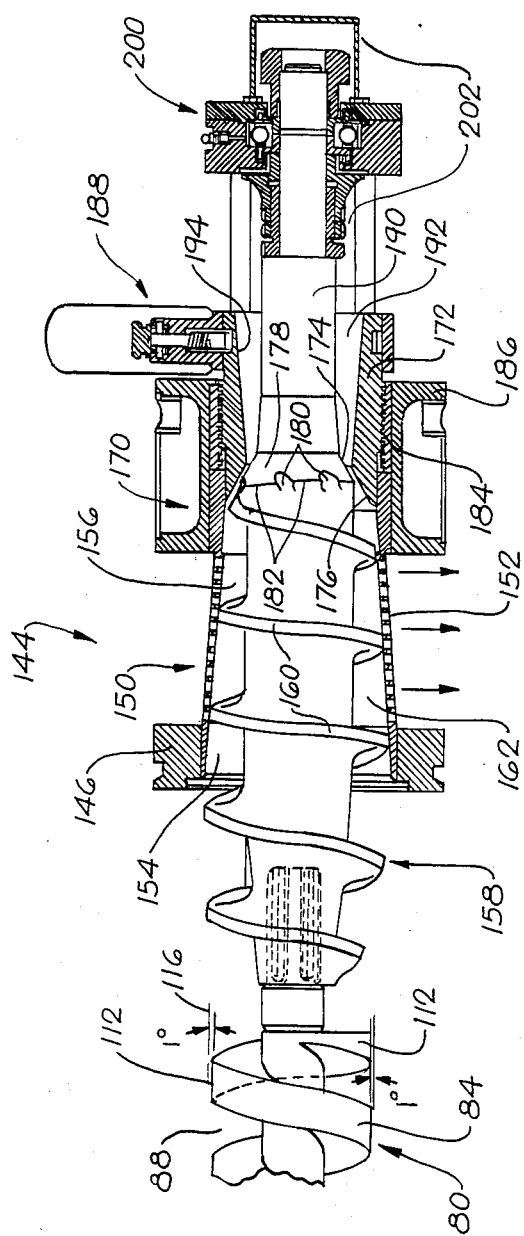
FIG. 10 is a fragmentary central longitudinal section taken through the separator screen and the separator casing for the machine of FIG. 1, and also showing the pressure auger and a portion of one of the pump screws.
Figure 13:
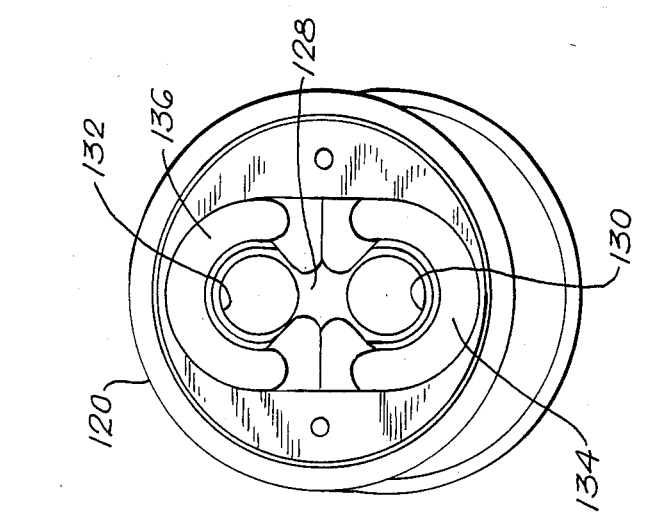
FIG. 13 is an end view showing the opposite end of the transitional housing of FIG. 11.
Figure 12:
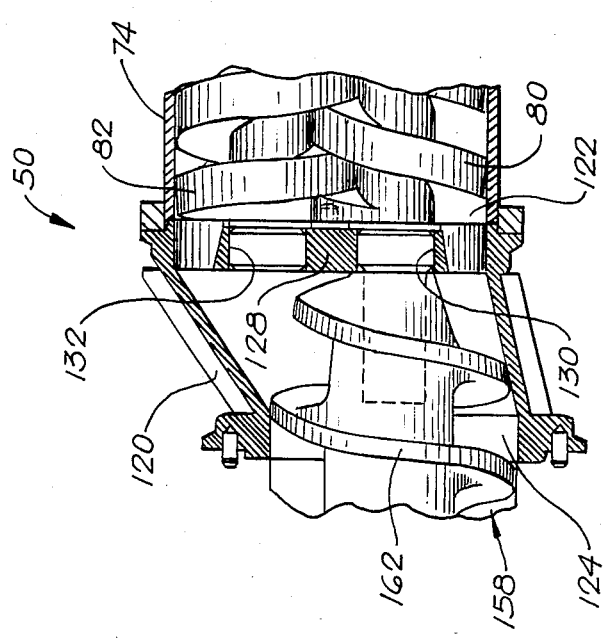
FIG. 12 is a central longitudinal section taken through the transitional housing of FIG. 11, generally along the line 12—12 therein, and also showing portions of the pressure auger and the pump screws.
Figure 11:
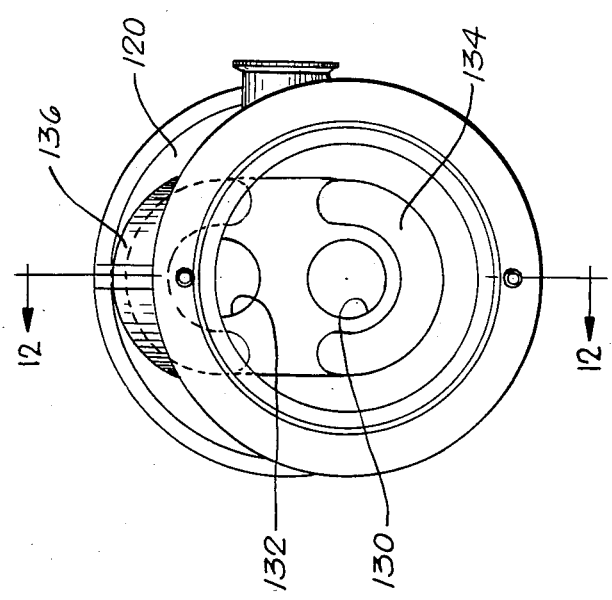
FIG. 11 is an end view showing one end of the transitional housing between the pump casing and the separator casing for the machine of FIG. 1.

As shown in FIGS. 1, 2 and 10, the separator casing 146 comprises a tubular separator screen 150 having a multitude of perforations 152 therein, through which the meat and other soft materials are pressed by the pressure in the separator casing 146. The tubular screen 150 is circular in cross section and is generally cylindrical, but is tapered to some extent and thus is frusto-conical in shape, as shown to best advantage in FIG. 10. The tubular screen 150 has entrance and exit ends 154 and 156.

The size of the perforations 152 may be varied considerably, depending on the characteristics of the food material being processed. The perforations 152 are large enough to pass the meat or other soft components, while retaining the highest feasible percentage of the bone or other hard components.

The pieces of food material are transported longitudinally within and along the separator casing 146 by a pressure auger 158 having screw flights 160 with grooves 162 therebetween. The screw flights 160 have close clearances with the separator screen 150 to maintain pressure in the separator casing 146. As shown, the auger 158 is tapered in outside diameter, in conformity with the taper of the separating screen 150. The tapering of the diameter of the screw flights 160 results in a progressive reduction in the volumetric carrying capacity of the pressure auger 158 toward the exit end 156 of the separator screen 150. Thus, the pressure auger 158 tends to maintain and build up the pressure in the separator screen 150.

The screw flights 160 of the pressure auger 158 are substantially narrower than the grooves 162 therebetween. Moreover, the size of the grooves 162 is sufficiently large to be comparable to the size of the bony or hard components of the food material pieces, so as to minimize crushing and grinding of the bony components by the separator screw 158. In this way, the production of fine bony or other hard particles is minimized.

The meat and other soft materials pressed through the perforations 152 in the separator screen 150 are deposited in any suitable receptacle, not shown, which may be placed under the separator screen 150.

At the exit end of the separator casing 146, the separator unit 144 is provided with discharge means 170 for discharging the bone and other hard components from the separator casing, after the auger 158 has conveyed the bony components past the separator screen 150. Such discharge means 170 may comprise an adjustable ring valve 172 which produces a restricted adjustable annular orifice 174 between a tapered internal surface 176 on the ring valve and a tapered external surface 178 on the exit end of the pressure auger 158. The restricted annular orifice 174 maintains pressure in the separator casing 146. In addition, the discharge means 170 may preferably comprise alternate grooves 180 and vanes 182 on the exit end of the pressure auger 158, for grinding or chopping the bony or other hard components into sufficiently small particles to pass through the restricted annular orifice 174. It will be seen from FIG. 10, that the grooves 180 and vanes 182 comprise portions of the tapered member 178 on the pressure auger 158. The grooves 180 and vanes 182 preferably have a helical angle for propelling the bony or other hard particles through the restricted annular orifice 174. It will be seen that the grooves 180 and vanes 182 are opposite the tapered internal surface 176 on the adjustable ring valve 172.

As shown in FIG. 10, the ring valve 172 has an adjustable screw threaded connection 184 with an exit end portion 186 of the separator casing 146, so that the ring valve 172 can be screwed into and out of the exit end 186, to vary the size of the annular orifice 174. An adjustable ratchet or detent mechanism 188 is preferably provided to facilitate the screw adjustment of the ring valve 172 and to maintain the ring valve in its adjusted position.

As shown in FIG. 10, the pressure auger 158 has an exit shaft extension 190 which passes through and beyond the ring valve 172, with ample clearance 192 between the shaft and the ring valve, to provide for the discharge of the bony components from the exit end of the ring valve 172. As shown, the ring valve 172 has a flaring internal surface 194 opposite the extension shaft 190 so that the clearance 192 increases progressively toward the exit end of the ring valve 172.

As shown in FIG. 10, the separator casing 146 supports an adjustable bearing assembly 200 which in turn supports the extension shaft 190 of the auger. The adjustable bearing assembly 200 incorporates precision screw adjusting means 202 whereby the position of the pressure auger 158 can be adjusted longitudinally along its axis with a high degree of precision, to provide for precise adjustment of the clearance between the externally tapered screw flights 160 and the internally tapered separator screw 150. This type of adjustment is known to those skilled in the art. The adjustment of the clearance between the tapered screw flights 160 and the internally tapered separator screen 150 controls the thickness of the filter mat which is maintained on the inside of the separator screen 150. Such filter mat is in the form of a thin layer or coating or fibrous materials and hard particles, maintained in the clearance space between the screw flights 160 and the separator screen 150. The filter mat assists in filtering out particles of bone and other hard materials so that such particles are prevented or restricted from passing through the perforated screen 150. It may be necessary or desirable to readjust the auger 158 from time to time, to readjust the clearance between the tapered screw flights 160 and the internally tapered separator screen 150, to compensate for wear and to regulate the thickness of the filter mat, for various applications of the machine.

FIGS. 16–21 illustrate a modified separating machine 230 comprising a modified embodiment of the present invention. The modified machine 230 incorporates the entire separator machine 30, constituting the first embodiment of FIGS. 1–15, plus a disjointer mechanism 232 which precedes the feed screws 34 and 36. The disjointer mechanism 232 is mounted in the hopper 32, above the feed screws 34 and 36.

As shown in FIGS. 15–21, the disjointer mechanism 232 comprises a pair of generally parallel oppositely rotating disjointer screws 234 and 236, mounted in the hopper 32 above the feed screws 34 and 36. The disjointer screws 234 and 236 rotate in such directions that the adjacent portions of the screws are moving downwardly, so as to draw the pieces of food material out of the hopper 32 and between the disjointer screws, so that they are supplied to the feed screws 34 and 36.

Figure 21:
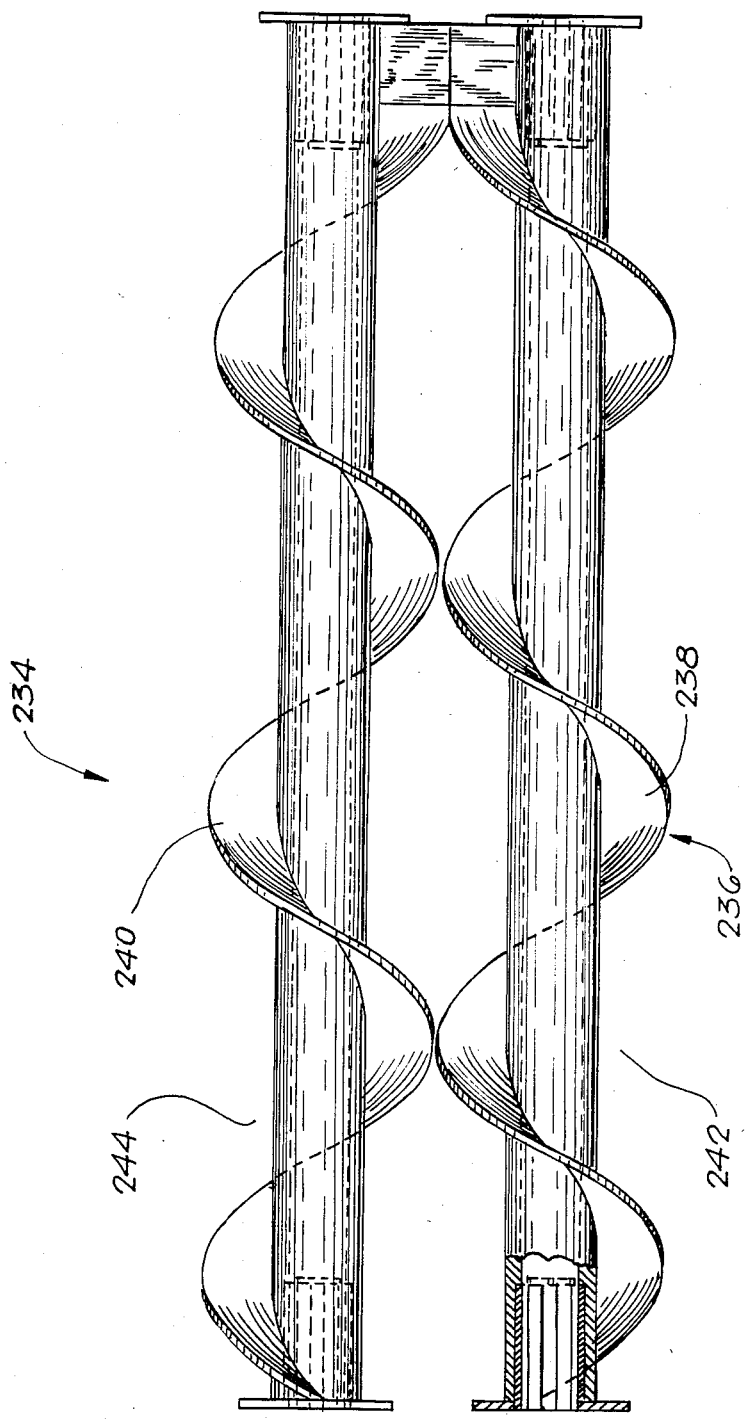
FIG. 21 is an enlarged fragmentary plan view, similar to a portion of FIG. 18, showing the disjointer screws.

The disjointer screws 234 and 236 have screw flights 238 and 240 which grooves 242 and 244 therebetween. Advantageously, the screw flights 238 and 240 of both disjointer screws 234 and 236 are of the same hand, such as left handed, as shown in FIGS. 18 and 21. Both screws could also be right handed. The oppositely rotating disjointer screws 234 and 236 tend to transport the incoming pieces of food material in opposite directions, along the longitudinal axes of the screws, so that the screws produce a tearing or disjointing action on the pieces, as the pieces are drawn between the screws. The value of this disjointing action can be illustrated by a specific example, in which the incoming pieces comprise a series of neck or spinal bones, still fastened together by connective tissue. The tearing or disjointing action of the screws 234 and 236 tends to pull the neck bones apart, so that the separate neck bones are supplied to the feed screws 34 and 36. The disjointer screws 234 and 236 also produce downward movement of the pieces and prevent upward movement.

It will be seen that the flights 238 and 240 of the disjointer screws 234 and 236 are substantially narrower than the grooves 242 and 244 between the flights. The narrow flights 238 and 240 have a cutting or slicing action. Moreover, the grooves 242 and 244 are sufficiently large in size to accommodate the disjointed pieces of incoming food materials, so as to minimize crushing or grinding of the bone or other hard components of such materials. Thus, the production of fine particles of bone or other hard materials is minimized.

The disjointer screws 234 and 236 are driven in opposite directions of rotation by driving means 250, shown to best advantage in FIGS. 19 and 20, which may comprise meshing gears 252 and 254 on the shafts 256 and 258 of the disjointer screws. An idler gear 260 may be provided between the gear 252 and the gear 54 for one of the feed screws 34 and 36. With this drive, the disjointer screw gears 252 and 254 are driven in opposite directions. The gear 252 is driven in the same direction as the feed screw gear 54. The disjointer screw gear 254 is driven in the same direction as the feed screw gear 56. Other suitable driving means may be provided for the disjointer screws 234 and 236.

Both the separating machine 30 of FIGS. 1-15 and the modified machine 230 of FIGS. 16-21 have the important advantage that the bony pieces or other pieces of food material are supplied to the separator unit 244 with a minimum of grinding or chopping of the bone or other hard components of the food material. As already explained, the disjointer screws 234 and 236 tend to tear apart or disjoint the incoming pieces as such pieces pass downwardly between the screws, but the bone and other hard components are not ground or chopped to any substantial extent. For this reason, the production of fine particles of bone or other hard materials is minimized. Similarly, the feed screws 34 and 36 are effective to feed the pieces to the screw pump 50, but without grinding the bony components to any substantial extent, so that the production of fine particles of hard material is minimized.

The overlapping screws 80 and 82 of the screw pump 50 having a pumping and transporting action on the pieces of food material, but the grooves 88 and 90 in the pump screws 80 and 82 are sufficiently large in size to minimize any grinding action on the hard components, so that the production of fine particles of hard materials is minimized.

By thus minimizing the production of fine particles, the pieces of food materials are supplied to the separator unit 144 with a minimum percentage of fine hard particles, which might otherwise go through the perforations 152 of the separator screen 150, with the meat and other soft components. The pressure auger 158 is also constructed so as to minimize grinding of the bony components, so as to minimize the production of fine hard particles. The grooves 162 in the pressure auger 158 are comparable in size to the size of the bone or other hard components, so that the hard components are transported by the pressure auger 158, without being ground to any substantial extent.

The bone or other hard components are not ground to any substantial extent until the pressure auger 158 transports the hard components past the separator screen 150, after which the bone and other hard components are ground by the alternate grooves 180 and vanes 182 on the exit end portion of the auger 158, where the flights 162 terminate. The grinding at this point reduces the bone and other hard components to particles of a sufficiently small size to pass through the restricted annular orifice 174 from which they are discharged out of the machine into any suitable receptacle, not shown.

Advantageously, the rotary operating speed of the separating machine is quite slow, typically about 50 r.p.m. However, the machine can be used successfully over a fairly wide range of rotary speeds, as, for example, from 18 to 400 r.p.m.

The separating machines can be used for separating meat and other soft components from all bony meat and fish materials. For best result, the size of the machine, particularly the size of the pump screws, should be proportioned to the size of the bone and other hard components in the material to be processed. The grooves in the pump screws should be comparable in size to the size of the bone or other hard components, to minimize grinding of such hard components.

The perforations in the separator screen may vary in size, according to the characteristics of the food materials to be processed by the machine. Due to the fact that the construction of the machine minimizes the production of fine hard particles of bone and other hard materials, the perforations can be made larger than otherwise would be possible, while minimizing the percentage of hard particles in the meat which passes through the perforations of the screen. Typically, the size of the perforations stated in decimal fractions of one inch ranges from 0.10 to 0.25.

The clearances between the pump screws and the pump bores are generally quite close, as are the clearances between the overlapping pump screws, to enable the pump screws to build up substantial pumping pressure. In the operation of the overlapping screw pump, the clearances are quite effectively sealed by fibrous materials, such as meat fibers, in the food materials being processed. The clearances, in terms of decimal fractions of 1 inch, may range from about 0.0005 to 0.120.

The clearance between the pressure auger and the separating screen may be varied in accordance with the material to be processed and the desired thickness of the filter mat. In terms of decimal fractions of 1 inch, a typical clearance is about 0.004, but the clearance may range downwardly to as small as 0.0001.

The separated bone and other hard components are discharged from the separating machine 30 through a chute extending downwardly from the discharge end of the separator housing 146, as shown in FIG. 1. The separated meat and other soft components, which pass through the separator screen 150, are discharged through an opening 272 in the separator casing 146.

Various other modifications, alternative constructions and equivalents may be employed without departing from the true spirit and scope of the invention, as defined in the following claims.

We claim:
1. A deboning machine for receiving pieces of bony meat or fish and for separating meat and other soft components from bone and other relatively hard components of such pieces, said machine comprising
   a hopper for receiving the pieces of meat or fish,
   said hopper having an exit opening,
   a pair of overlapping oppositely rotating feed screws for feeding such pieces out of said hopper and into said opening, a pump casing connected to said hopper and having overlapping pump bores with entrance ends connecting with said exit opening, said pump bores also having exit ends, said pump casing otherwise being substantially imperforate, a pair of overlapping oppositely rotating pump screws rotatably received in said pump bores for pumping said pieces along said bores between said entrance and exit ends thereof to develop pumping pressure, said pump screws connecting coaxially with said feed screws, drive means for driving said feed screws and said pump screws in opposite directions of rotation, said pump screws having close clearances with said pump bores and with each other for developing pumping pressure at said exit ends of said pump bores, a hollow separating casing having an entrance end connecting substantially directly with said exit ends of said pump bores for receiving said pieces therefrom, said separator casing also having an exit end, said separator casing having a generally tubular separator screen disposed between said entrance and exit ends of said separator casing, said screen having a multiplicity of perforations through which meat and other soft components are pressed while said screen retains bones and other hard components, a pressure auger rotatable in said separator casing and having close clearance with said separator screen for pressing meat and other soft components through said perforations while transporting bone and other hard components past said separator screen to said exit end of said separator casing, additional driving means for rotating said pressure auger, and discharge means at said exit end of said separator casing for discharging the bone and other hard components therefrom while maintaining pressure in said separator casing.

2. A machine according to claim 1, said overlapping oppositely rotating feed screws having respective left and right hand screw flights with grooves therebetween, the screw flight of each feed screw meshing with the groove of the other feed screw, said screw flights of said feed screws being substantially narrower than the grooves therebetween to minimize crushing and grinding of the pieces transported by the feed screws.

3. A machine according to claim 1, said pressure auger having a coaxial driving connection to one of said pump screws for causing said auger to rotate with such pump screw.

4. A deboning machine for receiving pieces of bony meat or fish and for separating meat and other soft components from bone and other relatively hard components of such pieces, said machine comprising a hopper for receiving the pieces of meat or fish, said hopper having an exit opening, a pair of overlapping oppositely rotating feed screws for feeding such pieces out of said hopper and into said opening, a pump casing connected to said hopper and having overlapping pump bores with entrance ends connecting with said exit opening, said pump bores also having exit ends, said pump casing otherwise being substantially imperforate, a pair of overlapping oppositely rotating pump screws rotatably received in said pump bores for pumping said pieces along said bores between said entrance and exit ends thereof to develop pumping pressure, said pump screws connecting coaxially with said feed screws, drive means for driving said feed screws and said pump screws in opposite directions of rotation, said pump screws having close clearances with said pump bores and with each other for developing pumping pressure at said exit ends of said pump bores, a hollow separator casing having an entrance end connecting substantially directly with said exit ends of said pump bores for receiving said pieces therefrom, said separator casing also having an exit end, said separator casing having a generally tubular separator screen disposed between said entrance and exit ends of said separator casing, said screen having a multiplicity of perforations through which meat and other soft components are pressed while said screen retains bone and other hard components, a pressure auger rotatable in said separator casing and having close clearance with said separator screen for pressing meat and other soft components through said perforations while transporting bone and other hard components past said separator screen to said exit end of said separator casing, additional driving means for rotating said pressure auger, and discharge means at said exit end of said separator casing for discharging the bone and other hard components therefrom while maintaining pressure in said separator casing, said pump bores and said pump screws having clearances therebetween which are greater toward the exit ends of said pump bores than at the entrance ends of said pump bores to reduce the buildup of pressure by said pump screws toward the exit ends of said pump bores.

5. A deboning machine according to claim 4, said pump screws having diameters which are tapered toward said exit ends of said pump bores, said tapered diameters being effective to produce said greater clearances.

6. A machine for receiving pieces of meat, fish or other food materials and for separating meat and other soft components from bone and other relatively hard components of such pieces, said machine comprising a pump including a pump casing having overlapping pump bores therein with entrance ends and exit ends, said pump casing otherwise being substantially imperforate, said pump including supply means for supplying such pieces to the entrance ends of said pump bores, a pair of overlapping oppositely rotating pump screws rotatably received in said pump bores for pumping such pieces along said bores between said entrance and exit ends thereof to develop pumping pressure, drive means for rotating said pump screws in opposite directions of rotation, said pump screws having close clearances with said pump bores and with each other for developing pumping pressure at said exit ends of said pump bores, a hollow separator casing having an entrance end connecting substantially directly with said exit ends of said pump bores for receiving said pieces therefrom, said separator casing also having an exit end, said separator casing having a generally tubular separator screen disposed between said entrance and exit ends of said separator casing, said screen having a multiplicity of perforations therein through which meat and other soft components are pressed while said screen retains bone and other hard components, a pressure auger rotatable in said separator casing and having close clearance with said separator screen for pressing meat and other soft components through said perforations while transporting bone and other hard components past said separator screen to said exit end of said separator casing, additional driving means for rotating said pressure auger, and discharge means at said exit end of said separator casing for discharging the bone and other hard components therefrom while maintaining pressure in said separator casing.

7. A machine according to claim 6, said supply means comprising feed screw means for feeding the pieces to said entrance ends of said pump bores.

8. A machine according to claim 6, said pump casing including an entrance member having an entrance opening connecting with said entrance ends of said pump bores, and feed screw means in said entrance opening for feeding the pieces to the entrance ends of said pump bores.

9. A machine according to claim 8, including means for rotatably driving said feed screw means.

10. A machine according to claim 8, said feed screw means including a pair of overlapping generally parallel feed screws and means for rotating said feed screws in opposite directions of rotation.

11. A machine according to claim 8, said feed screw means including a pair of overlapping generally parallel feed screws, and drive means for rotating said feed screws in opposite directions of rotation such that the overlapping portions of said feed screws are moving away from said entrance member to draw such pieces from said entrance member and between said feed screws.

12. A machine according to claim 6, said pump bores and said pump screws having clearances therebetween which are greater toward the exit ends of said pump bores than at the entrance ends of said pump bores to reduce the buildup of pressure by said pump screws toward the exit ends of said pump bores.

13. A machine according to claim 6, said pump screws having exit end portions tapered in outside diameter toward said exit ends of said bores to afford greater clearances between said pump bores and said pump screws toward the exit ends of said pump bores than at the entrance ends thereof to reduce the buildup of pressure by said pump screws toward the exit ends of said pump bores.

14. A machine according to claim 6, said pump screws having screw flights with grooves therebetween, said pump screws being generally parallel and having the screw flights of each pump screw meshing with the grooves of the other pump screw.

15. A machine according to claim 6, said pump screws having respective left and right hand screw flights with grooves therebetween, said pump screws being generally parallel, said screw flights of each pump screw meshing with the grooves of the other screw.

16. A machine according to claim 6, said pump screws having respective left and right hand screw flights which have grooves therebetween, the screw flight of each pump screw meshing with the groove of the other pump screw, said flights being slightly narrower than said grooves to afford close clearances therebetween, said grooves being of a size comparable to the size of the pieces to be pumped so as to minimize crushing and grinding of said pieces by said pump screws.

17. A machine according to claim 6, said discharge means comprising a circular end portion on said auger end of circular cross section, and an annular valve member disposed around said circular end portion and forming a restricted annular orifice therebetween for restricting the discharge of the bone and other hard components to maintain pressure in said separator casing, and a plurality of alternate vanes and grooves on said auger adjacent said annular orifice for grinding the bone and other hard components into particles of a size capable of being discharged through said annular orifice.

18. A machine according to claim 6, said pump screws having screw flights alternating with grooves, said grooves being of a size comparable to the size of the pieces to be transported by said pump screws to minimize crushing of the bony components of the pieces, said auger having screw flights alternating with grooves, said grooves of said auger being of a size comparable to the size of the bony components to minimize crushing and grinding of the bony components.

19. A machine for receiving pieces of meat, fish or other food materials and for separating meat and other soft components from bone and other relatively hard components of such pieces, said machine comprising a pump including a pump casing having overlapping pump bores therein with entrance ends and exit ends, said pump including supply means for supplying such pieces to the entrance ends of said pump bores, a pair of overlapping oppositely rotating pump screws rotatably received in said pump bores for pumping such pieces along said bores between said entrance and exit ends thereof to develop pumping pressure, drive means for rotating said pump screws in opposite directions of rotation, said pump screws having close clearances with said pump bores and with each other for developing pumping pressure at said exit ends of said pump bores, a hollow separator casing having an entrance end connecting with said exit ends of said pump bores for receiving said pices therefrom, said separator casing also having an exit end, said separator casing having a generally tubular separator screen disposed between said entrance and exit ends of said separator casing, said screen having a multiplicity of perforations therein through which meat and other soft components are pressed while said screen retains bone and other hard components, a pressure auger rotatable in said separator casing and having close clearance with said separator screen for pressing meat and other soft components through said perforations while transporting bone and other hard components past said separator screen to said exit end of said separator casing, additional driving means for rotating said pressure auger, and discharge means at said exit end of said separator casing for discharging the bone and other hard components therefrom while maintaining pressure in said separator casing, said pump casing including an entrance member having an entrance opening connecting with said entrance ends of said pump bores, and feed screw means in said entrance opening for feeding the pieces to the entrance ends of said pump bores, said feed screw means including a pair of overlapping generally parallel feed screws, and drive means for rotating said feed screws in opposite directions of rotation such that the overlapping portions of said feed screws are moving away from said entrance member to draw such pieces from said entrance member and between said feed screws, said machine including a pair of parallel closely spaced disjointer screws in said entrance member for feeding such pieces from said entrance member to said feed screws while tending to disjoint such pieces, and disjointer screw drive means for rotating said disjointer screws in opposite directions of rotation such that the closely adjacent portions of said disjointer screws are moving away from said entrance member and toward said feed screws to propel such pieces from said entrance member and toward said feed screws.

20. A machine according to claim 19, in which said oppositely rotating disjointer screws have screw flights of the same hand, whereby said disjointer screws tend to propel such pieces in opposite directions relative to the longitudinal axes of said disjointer screws, said disjointer screws thereby tending to tear and disjoint such pieces.

21. A deboning machine for receiving pieces of bony meat or fish and for separating meat and other soft components from bone and other relatively hard components of such pieces, said machine comprising a hopper for receiving the pieces of meat or fish, said hopper having an exit opening, a pair of overlapping oppositely rotating feed screws for feeding such pieces out of said hopper and into said opening, a pump casing connected to said hopper and having overlapping pump bores with entrance ends connecting with said exit opening, said pump bores also having exit ends, a pair of overlapping oppositely rotating pump screws rotatably received in said pump bores for pumping said pieces along said bores between said entrance and exit ends thereof to develop pumping pressure, said pump screws connecting coaxially with said feed screws, drive means for driving said feed screws and said pump screws in opposite directions of rotation, said pump screws having close clearances with said pump bores and with each other for developing pumping pressure at said exit ends of said pump bores, a hollow separator casing having an entrance end connecting said said exit ends of said pump bores for receiving said pieces therefrom, said separator casing also having an exit end, said separator casing having a generally tubular separator screen disposed between said entrance and exit ends of said separator casing, said screen having a multiplicity of perforations through which meat and other soft components are pressed while said screen retains bone and other hard components, a pressure auger rotatable in said separator casing and having close clearance with said separator screen for pressing meat and other soft components through said perforations while transporting bone and other hard components past said separator screen to said exit end of said separator casing, additional driving means for rotating said pressure auger, and discharge means at said exit end of said separator casing for discharging the bone and other hard components therefrom while maintaining pressure in said separator casing, said machine including a pair of generally parallel closely spaced oppositely rotating disjointer screws in said hopper for feeding such pieces from said hopper to said feed screws, and disjointer screw drive means for rotating said disjointer screws in opposite directions such that the closely adjacent portions of said disjointer screws are moving away from said hopper and toward said feed screws, said disjointer screws tending to tear and disjoint such pieces.

22. A machine according to claim 21, in which said oppositely rotating disjointer screws have screw flights of the same hand, whereby said disjointer screws tend to propel such pieces in opposite directions along the longitudinal axes of said disjointer screws as such pieces are propelled between said disjointer screws, thereby producing a tearing and disjointing action on said pieces.

* * * * *